Oct. 6, 1964 E. F. ENGLES, JR., ETAL 3,151,799
PACKAGING TRAY

Filed April 4, 1962 2 Sheets-Sheet 1

INVENTORS.
Earl F. Engles, Jr.
Donald A. Shmidt
BY Lloyd E. Hessenaur jr.
ATTORNEY Oct. 6, 1964 E. F. ENGLES, JR., ETAL 3,151,799
PACKAGING TRAY
Filed April 4, 1962 2 Sheets-Sheet 2
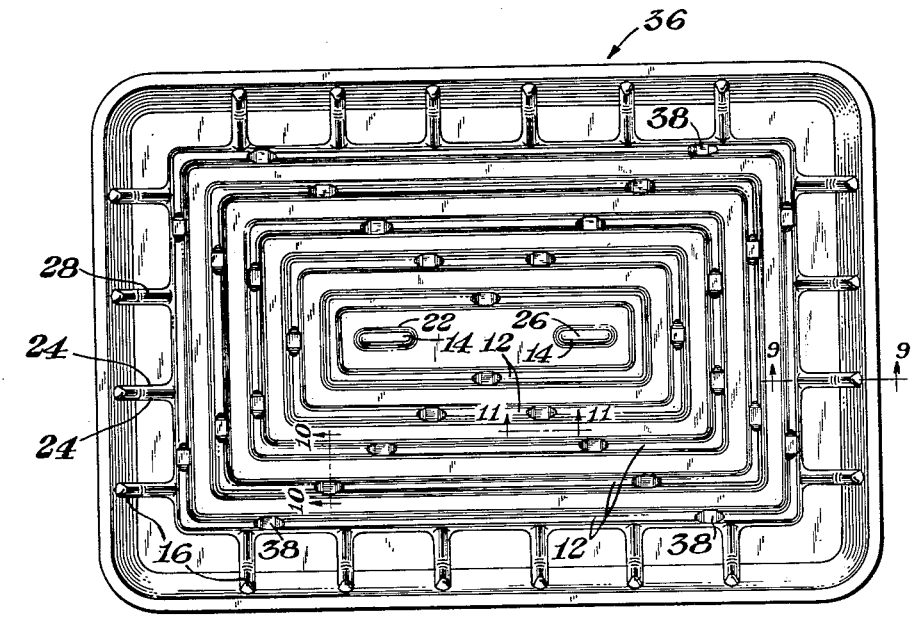
Fig. 6
Fig. 7
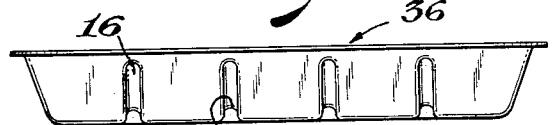
Fig. 8
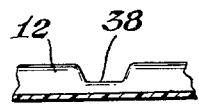
Fig. 11
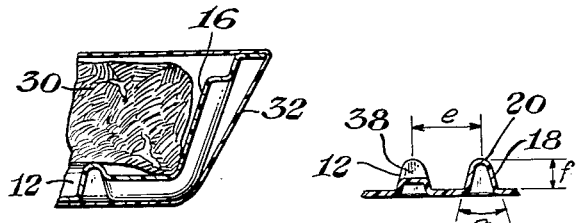
Fig. 9  Fig. 10
INVENTORS.
Earl F. Engles, Jr.
Donald A. Shmidt
BY 
ATTORNEY United States Patent Office 3,151,799
Patented Oct. 6, 1964

3,151,799
PACKAGING TRAY
Earl F. Engles, Jr., and Donald A. Shmidt, Midland, Mich., assignors to The Dow Chemical Company, Midland, Mich., a corporation of Delaware
Filed Apr. 4, 1962, Ser. No. 185,101
4 Claims. (Cl. 229—2.5)

This invention relates generally to an improvement in the packaging of fresh meats and, more particularly, it relates to a novel tray structure of thermoplastic material for preventing meat discoloration over relatively long periods of time.

Previous attempts to employ plastic trays for meat handling have not been completely satisfactory in preventing meat discoloration over comparably long periods of time under normal refrigeration. Rapid discoloration of fresh meats by a brown pigment, commonly referred to as metmyoglobin, has been a problem especially in the display of such products in self-serve markets where they are left to stand for long periods of time for customer selection. Fresh meats initially have a purplish-red pigment myoglobin which, it is believed, is converted to the bright red oxymyoglobin by complexing with molecular oxygen. However, long continued oxidation of the myoglobin and oxymyoglobin results in the discoloring brown pigment metmyoglobin, the relative proportions of the different forms of pigments being dependent upon the partial pressure of oxygen. Thus, too great a contact with oxygen results in a quickening of the discoloration of meat products. However, it has also been discovered that relatively rapid discoloration of contained meat products occurs on the side of the meat in contact with the plastic in plastic type trays. There thus seems to be a balance necessary whereby only a limited quantity, but some, of oxygen be present and a minimum of contact between the plastic tray and meat be maintained.

In an effort to solve the problem in prior plastic trays, attempts had been made to provide them with ribbed bottom structures to keep the bulk of the supported meat surface away from contact with the plastic tray, and provide a small oxygen containing area between the ribs. However, especially in meat without bone structure, there still was a tendency for the meat to sag between the rib supports which still resulted in rapid meat discoloration because of the large area of contact still present between the meat and the tray and the resultant reduction of the air space therebetween. This air space is particularly important in that it is believed that a certain degree of oxygen concentration forms the red pigment oxymyoglobin.

Accordingly, it is an object of the present invention to provide plastic trays minimizing the brown pigment discoloration tendency of meats contained therein.

A further object of the present invention is to provide a novel plastic tray for supporting meat with a minimum of contact between the meat and the plastic material of the tray.

A still further object is to provide a novel plastic tray structure which provides a large degree of air space between the surface of the meat product facing the tray and the tray itself.

A still further object of the present invention is to provide a meat tray permitting adequate circulation of air around substantially all surfaces of a meat contained therein.

A still further object of the present invention is to provide meat supporting structure within a plastic tray which minimizes discoloration of a supported meat product and which maximizes the structural strength of the tray.

Briefly then, the present invention relates to a plastic tray having a ribbed bottom surface of such a structure that the amount of discoloration of a meat product contained therein is substantially minimized with respect to time and under conditions of normal refrigeration, while still maintaining the structural rigidity of the tray itself. It has been discovered that a ribbed plastic tray including a rib spacing of a certain range, a rib height of a certain range and an occluded angle between the sides of each rib of a certain range, provides for substantially increased performance of the plastic tray and meat package, provided that the specific plastic used is properly deformable within the necessary boundaries.

Yet additional objects and advantages of the present invention, and its numerous cognate benefits and features are even more apparent and manifest in and by the ensuing description and specification taken in conjunction with the accompanying drawing in which wheresoever possible, like characters of reference designate corresponding material and parts throughout the several views thereof, in which:

FIGURE 6 is a top plan view of a modified form of a tray constructed according to the principles of the present invention;

FIGURE 7 is a front elevational view of the tray shown in FIGURE 6;

FIGURE 8 is a side elevational view of the tray shown in FIGURE 6;

FIGURE 9 is an enlarged fragmentary cross-sectional view of the tray of FIGURE 6 taken along the reference line 9—9 thereof, and further illustrating a meat product and a film overwrap;

FIGURE 10 is an enlarged fragmentary cross-sectional view of the tray of FIGURE 6 taken along the reference line 10—10 thereof; and FIGURE 11 is an enlarged fragmentary cross-sectional view of the tray of FIGURE 6 taken along the reference line 11—11 thereof.

Figure 1:
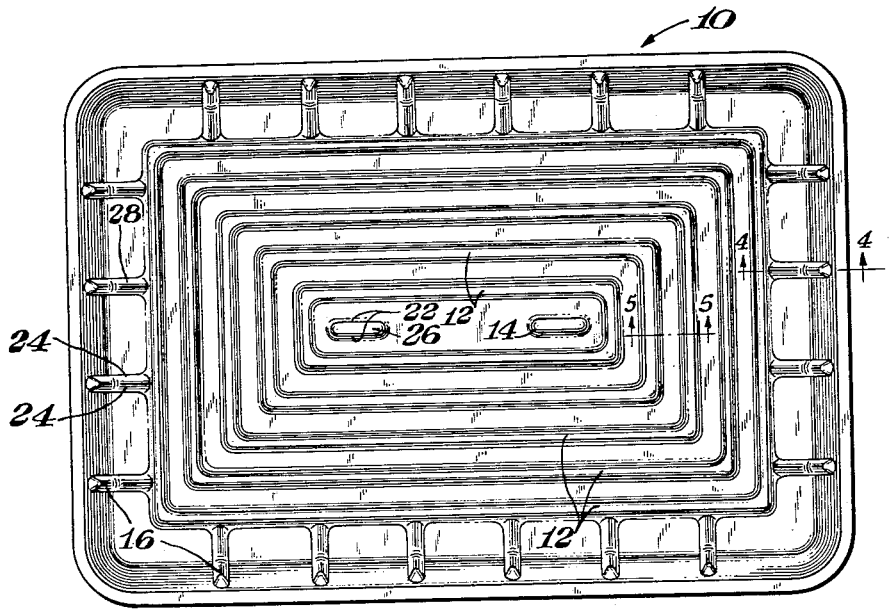
FIGURE 1 is a top plan view of a plastic tray construction according to the principles of the present invention.
Figure 2:
FIGURE 2 is a front elevational view of the tray shown in FIGURE 1.
Figure 3:
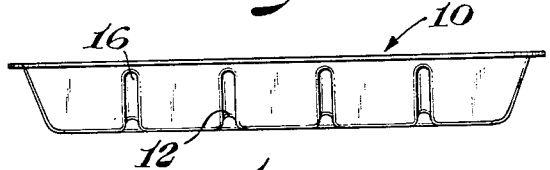
FIGURE 3 is a side elevational view of the tray shown in FIGURE 1.

A novel plastic tray 10 of the present invention can include a series of spaced ribs or projections 12 extending upwardly from the bottom surface thereof. As shown, ribs 12 are in a concentric arrangement forming progressively larger rectangular configurations as the ribs 12 are located outwardly from the central portions of the tray 10. Although this concentric pattern is favorable because of the structural rigidity it lends to the tray, other configurations are possible provided the features of the rib structure itself are similar and the spacing of ribs from one another is still in the proper range. Independent meat supporting ribs 14 can be located generally along the longitudinal center line of the tray. Furthermore, peripheral ribs 16 can be located about the extremity of outermost rib 12 to prevent twisting of the tray as well as acting, secondarily, as support for the meat. Each of the ribs 12 includes opposite sides or surfaces 18 which at their apexes meet with an occluded angle $a$ forming an apex surface 20, upon which the meat is to rest. Additional ribs 14 and 16 can also include opposite surfaces 22 and 24, respectively, and apex surfaces 26 and 28, respectively. The spacing e between each rib 12 is found to be critical as well as is the height f of each rib.

It has been found that a plastic tray having a rib spacing e of between ¼ inch and ½ inch, a rib height f of about ⅛ inch or more, and an occluded angle a of between about 20 and 40 degrees provides for an unusual retention period of the desirable bright red color of meat contained therein. The rib spacing is especially critical for if the ribs are much closer than ¼ inch then too much contact of the meat with plastic occurs and a proper occluded angle can not be maintained, and if the ribs are much further apart than ½ inch then too much draping of the meat between the ribs occurs. If the rib height is much less than ⅛ inch then there is not enough height to keep the meat separated from the tray bottom within the desirable rib spacing indicated above. However, the maximum rib height is not as critical and considering all practical factors, such as conserving space and material, it has been found preferable that the maximum rib height should not exceed ¼ inch. It is to be understood though, that it is possible, considering the other limits involved, to have a rib height approaching 1⁷⁄₁₆ inches and still have a tray which even though not as practical, is still one which provides excellent color retention properties for meat contained therein. With an occluded angle much greater than 40 degrees, too much draping of the meat occurs, as discussed previously with respect to the prior art, and with an occluded angle much less than 20 degrees there generally is not enough body to the rib structure to provide adequate support for the meat. In any case, the minimum angle of 20 degrees is not quite as critical as other factors and an occluded angle of even a smaller size can work if the other factors are adequate. If desired, the apex surfaces 20 of the ribs 12 can be rounded, by forming a radius edge as shown, to prevent scoring of the meat by what would otherwise be sharp edges where surfaces 18 meet.

It is important that a plastic material be chosen which can be readily formed physically with the limitations or ranges above discussed. An ideal film for this application can be biaxially oriented polystyrene film of about 8 mils in thickness. It is to be understood that films of other thermoplastic polymers can also be used, such as high impact polystyrene, styrene copolymers, polyethylene, polypropylene, polyvinyl chloride, ethocellulose, and cellulose acetate. It is to be further understood that expanded plastics, such as polystyrene foam and polyethylene foam for example, can also provide a similarly effective ribbed tray when constructed in accordance with the principles of the present invention.

Figure 4:
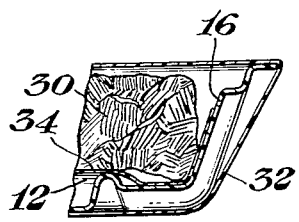
FIGURE 4 is an enlarged fragmentary cross-sectional view of the tray shown in FIGURE 1 and taken along the reference line 4—4 thereof, and further illustrating a meat product and a film overwrap.

Illustrated more particularly in FIGURE 4, it is customary to cover a meat product 30 in tray 10 with a film overwrap 32, the latter usually being of a cellophane sheet. The overwrap can be brought around the sides of tray 10 and heat sealed under the bottom thereof as is customary with paper pulp trays. If desired a film underlay 34, preferably of cellophane, can also be located between meat product 30 and the supporting ribs of tray 10. Cellophane is peculiarly adapted for this use in that it is quite air permeable when wet so as to still permit oxygen to reach the underside of the meat product when employed. The use of such an underlay gives only little, if any, noticeable advantage as far as color retention is concerned although it does prevent direct contact of the meat product with the plastic material of the tray. However, the use of an underlayer does increase the cost of packaging and, because of this important factor, in most instances it probably is not desirable to use it.

A test was run employing different trays for meat to determine comparably the rate of meat deterioration which accompanied the use of each tray as evidenced by the degree of discoloration (formation of metmyoglobin) over different periods of time. Round steak was the meat used in the test, each steak being ¼ to ⅜ inch thick and all sawed off of the same round. The meat samples, in their respective trays, were placed in a typical refrigerated counter, at approximately 40° F., of a food market and left to stand. After certain designated periods of time color pictures using 35 mm. film were taken and a panel of several people rated the degree of discoloration of each meat sample in the pictures without knowing which particular sample they were viewing. They rated the meat as follows:

5 (Superior)—Less than 5% of the area discolored.
4 (Excellent)—Between 5% and 10% of the area discolored.
3 (Good)—Between 10% and 25% of the area discolored.
2 (Fair)—Between 25% and 50% of the area discolored.
1 (Poor)—More than 50% of the area discolored.

The different samples were tested using a typical paper pulp tray; a prior art polystyrene plastic tray 8 mils thick employing straight parallel ribs about ⅛ inch in height spaced ⅝ inch apart, with an occluded rib angle a of 80 degrees; a prior art plastic tray as above only with cellophane underlay between the meat and the ribs; a polystyrene plastic tray 8 mils thick constructed according to this invention and employing generally continuous ribs ³⁄₁₆ inch in height spaced ⅜ inch apart, with an occluded angle a of 28 degrees; and a tray as last described with a cellophane underlay between the meat and the ribs. After the meat samples were placed in the trays they were all covered by a typical heat sealed cellophane sheet.

The approximate results of the test are found in the table below averaging the opinions of those viewing the different samples.

*Table*

| Tray, Kind | Time and Rating | | | |
| --- | --- | --- | --- | --- |
| | 24 hrs. Rating | 48 hrs. Rating | 72 hrs. Rating | 96 hrs. Rating |
| Paper Pulp | 5 | 3 | 1 | 1 |
| Prior Art Plastic | 4 | 3 | 1 | |
| Prior Art Plastic with Cellophane Underlay | | 4 | 1 | |
| New Design Plastic (Continuous Rib) | 5 | 5 | 4 | 2 |
| New Design Plastic with Cellophane Underlay | | 4.5 | 4.5 | |

From viewing the above test results it can readily be seen that the new design tray constructed according to the principles of the present invention was far superior than those previously known, particularly as the time increased as, for example, at 48 and 72 hours. At 72 hours only meat packaged in trays formed according to the principles of this invention were still acceptable.

Figure 5:
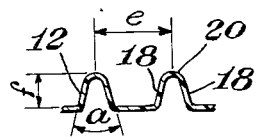
FIGURE 5 is an enlarged fragmentary cross-sectional view of the tray shown in FIGURE 1 and taken along the reference line 5—5 thereof.

A modification of the present invention appears in FIGURE 5 where a tray 36 is shown which is substantially similar to the tray 10 previously described with the exception that spaced notches 38 are formed within each of the ribs 12. Such notches can be used where it is desirable to increase the air circulation throughout areas between ribs 12, but it should be noted that it is most desirable that notches 38 be staggered so as to prevent their substantially weakening the structural rigidity of the tray. The notches should be of a length and depth so that meat normally will not drape far into its cavity, but should be of a depth less than that necessary to reach the bottom surface of the tray so as not to weaken the latter's structural rigidity. In all other aspects the dimensions and limitations are substantially the same as with tray 10.

While certain representative embodiments and details have been shown for the purpose of illustrating the invention, it will be apparent to those skilled in the art that various changes and modifications can be made therein without departing from the spirit and scope of the invention.

Accordingly, what is claimed as new is:

1. An imperforate plastic meat tray having a bottom surface, elongated spaced ribs extending upwardly from said bottom surface, said ribs having a generally triangular cross-section including opposite sides meeting at an apex surface, said ribs being spaced a distance of ¼ to ½ inch apart, each of said ribs having a height greater than ⅛ inch and with the sides thereof approaching the apex surface so that the occluded angle is between about 20 and 40 degrees.

2. An imperforate plastic meat tray having a bottom surface, elongated spaced ribs extending upwardly from said bottom surface, said ribs having a generally triangular cross-section including opposite sides meeting at a radius apex surface, said ribs being spaced a distance of ¼ to ½ inch apart, each of said ribs having a height of ⅛ inch to 1 7/16 inches and with the sides thereof approaching the apex surface so that the occluded angle is between about 20 and 40 degrees.

3. An imperforate plastic meat tray having a bottom surface, continuous concentrically spaced ribs extending upwardly from said bottom surface, said ribs having a generally triangular cross-section including opposite sides meeting at an apex surface, said ribs being spaced a distance of ¼ to ½ inch apart, each of said ribs having a height of ⅛ inch to 1 7/16 inches and with the sides thereof approaching the apex surface so that the occluded angle is between about 20 and 40 degrees.

4. An imperforate plastic meat tray having a bottom surface, elongated spaced ribs extending upwardly from said bottom surface, at least some of said ribs including notches to permit air to circulate between said ribs, said ribs having a generally triangular cross-section including opposite sides approaching an apex surface, said ribs being spaced a distance of ¼ to ½ inch apart and having a height greater than ⅛ inch, said opposite sides approaching the apex surface so that the occluded angle is between about 20 and 40 degrees.

References Cited in the file of this patent

UNITED STATES PATENTS

| | | |
|---|---|---|
| 2,080,125 | Frost | May 11, 1937 |
| 2,893,877 | Nickolls | July 7, 1959 |
| 2,918,379 | Lurie | Dec. 22, 1959 |
| 3,003,884 | Andrews | Oct. 10, 1961 |
| 3,029,149 | De Long | Apr. 10, 1962 |
| 3,067,921 | Reifers | Dec. 11, 1962 |